Nov. 11, 1930.                J. F. MONNOT                1,780,935
                         ALKALINE STORAGE BATTERY
                            Filed July 31, 1928
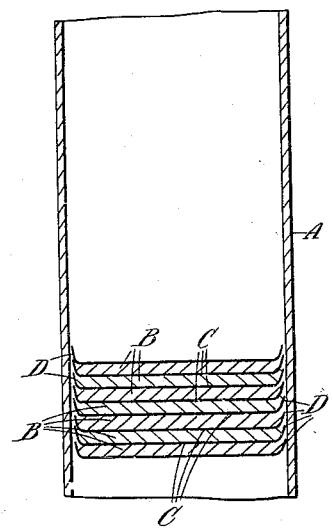
Inventor
John Ferreol Monnot
By
Pennie Davis Marvin & Edmonds
Attorneys Patented Nov. 11, 1930

1,780,935

UNITED STATES PATENT OFFICE

JOHN FERREOL MONNOT, OF LONDON, ENGLAND

ALKALINE STORAGE BATTERY

Application filed July 31, 1928, Serial No. 296,470, and in Great Britain November 4, 1927.

This invention relates to alkaline storage batteries of the kind in which the positive plate is made up of perforated metallic, usually steel, tubes of substantially circular cross-section filled with alternate layers of the active material. Hitherto these tubes have been filled with alternate layers of nickel hydroxide and pure nickel flake, the object of the use of the latter being to increase the electrical conductivity through the active material in the tube, as the nickel hydroxide itself is not electrically conductive. This effect, however, is only partially obtained with the method of filling the tubes just described, since the electric current is conveyed to the metal of the tubes and the nickel flake does not make a permanent contact with the walls of the tubes and thus does not function to conduct the electric current through the nickel hydrate. Another disadvantage of the tubes for the positive plate as previously made is that the active material is liable to escape through the comparatively large perforations in the walls of the tubes.

The present invention has for its object to overcome the disadvantages above mentioned, and for this purpose according to the present invention the metallic tubes of the kind referred to are filled with alternate layers of perforated nickel foil and of nickel hydroxide, the pieces of nickel foil employed being made larger than the internal cross-sectional area of the tubes so that the said pieces of foil make good contact with the walls of the containing tubes when forced thereinto.

In order that the said invention may be clearly understood and readily carried into effect, the same will be more fully described with reference to the accompanying drawing, which illustrates a section of a positive tube filled according to my improved method.

A represents the wall of one of the perforated steel tubes of which the positive battery plate is composed—B, B represent the layers of nickel hydroxide and C, C pieces of thin finely perforated nickel foil. The pieces of perforated nickel foil are cut in the form of squares larger than the inside diameter of the containing tube; for example with a tube the inside diameter of which is ¼ inch, the nickel foil would be cut in squares of about $\frac{5}{16}$ inch. The squares of nickel foil are pushed down inside the containing tube by a small ram and as they are square instead of circular and larger than the containing tube the excess metal of the squares of foil will press closely against the walls of the tube, as indicated at D. After a square of perforated nickel foil has been inserted in the tube, a layer of about 1 millimetre of nickel hydroxide is pressed in, then another square of the nickel foil, and so on until the tube is filled up under considerable pressure.

A section of the tube after filling in the manner described shows that the layers of nickel foil are closely jammed against the walls of the metallic tubes and in fact there is a continuous coating of nickel foil inside the said tube, and as the nickel foil is also finely perforated it helps to retain in the interior of the tube the active material.

Whereas in the construction of positive tubes previously employed the active material can escape through the comparatively large perforations of the tubes, with the new method of filling now adopted the active material is retained securely inside the tube by the additional nickel foil coating enveloping entirely the active material and extending right across the tube between the layers of active material, thus ensuring a perfect electrical conductivity.

The use in alkaline storage batteries of positive plates having tubes filled by the present method also corrects defects such as high internal resistance and increase of such resistance with time that have hitherto been the principal drawbacks of batteries having plates of the old type.

What I claim and desire to secure by Letters Patent of the United States is:—

1. A metallic tube of substantially circular cross-section for use in the positive plates of alkaline storage batteries, said tube having a filling of alternate layers of nickel hydroxide and of pieces of perforated nickel foil having an area larger than the internal cross-sectional area of the tube.

2. A metallic tube of substantially circular cross-section for use in the positive plates of alkaline storage batteries, said tube having a filling of alternate layers of nickel hydroxide and of pieces of perforated nickel foil, each such piece of nickel foil which is interposed between two layers of nickel hydroxide comprising one single finely perforated sheet having an area so much larger than the internal cross-sectional area of the tube that a substantially continuous coating of nickel foil is formed close against the walls of the tube by the excess metal of the superposed pieces of nickel foil.

3. A metallic tube as in claim 2 in which the tube has an inside diameter of about $\frac{1}{4}$ inch and the pieces of nickel foil comprise squares of about $\frac{5}{16}$ inch.

JOHN FERREOL MONNOT.